May 23, 1950   W. P. McCLELLAN ET AL   2,508,679
TENT SUSPENSION APPARATUS
Filed April 15, 1946   2 Sheets-Sheet 1

INVENTORS
William P. McClellan
Frank Sciples
BY Morsell & Morsell
ATTORNEYS

May 23, 1950 W. P. McCLELLAN ET AL 2,508,679
TENT SUSPENSION APPARATUS
Filed April 15, 1946 2 Sheets-Sheet 2
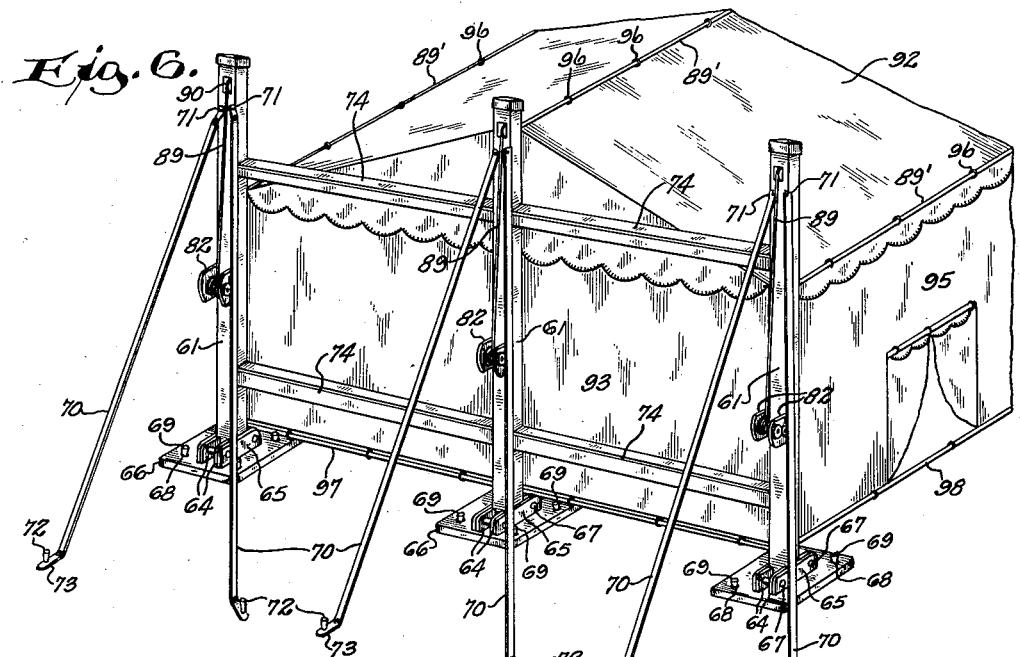
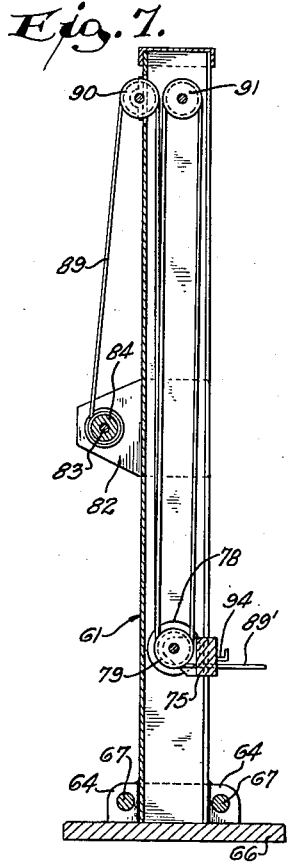
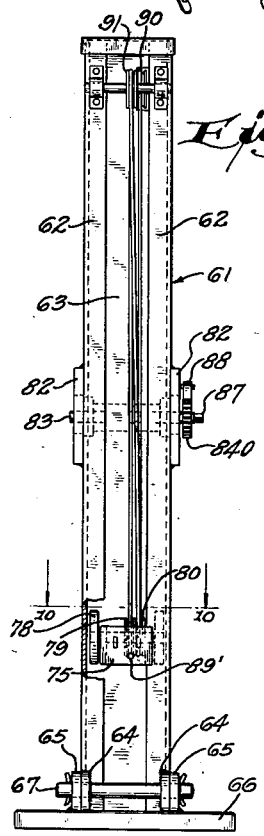
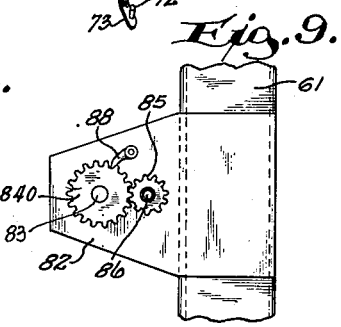
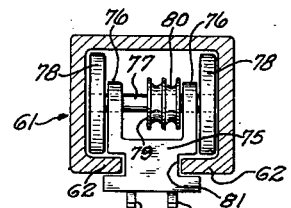
INVENTORS
William P. McClellan
Frank Sciples
BY
Morsell & Morsell
ATTORNEYS.

Patented May 23, 1950

2,508,679

UNITED STATES PATENT OFFICE 2,508,679

TENT SUSPENSION APPARATUS

William P. McClellan and Frank A. Sciples, Milwaukee, Wis.

Application April 15, 1946, Serial No. 662,196

11 Claims. (Cl. 135—1)

This invention relates to improvements in tent suspension apparatus.

The erection of tents for use in carnivals, fairs, or for other purposes, consumes considerable time and requires the services of a substantial number of helpers.

It is a general object of the present invention to provide improved tent suspension apparatus which can be manipulated by one or two men to quickly erect a relatively large size tent.

A further object of the invention is to provide tent suspension apparatus wherein the necessity of utilizing interior poles is eliminated, and wherein the lower edges of side walls may be firmly held in place without the use of the usual ground stakes, thereby eliminating the tedious stake pounding operations which are ordinarily necessary.

A further object of the invention is to provide an apparatus as above described, and including vertical supporting posts, wherein said posts are equipped with vertically movable elevators for raising the canvas top and the fabric sides to be suspended therefrom.

A further object is to provide, as one form of the invention, supporting mechanism carried by a truck or trailer body whereby two or more of said bodies may be used as anchorage for the canvas sustaining cables.

A still further object of the invention is to provide in the truck or trailer body adaptation, vertical supporting posts secured to the bodies, said posts having telescoping sections for increasing the effective length of the posts when said bodies are being used for tent supporting purposes. In this form of the invention the same bodies which support the tent are used for transporting the tent and the user's other equipment when moving from one location to another.

A further object of the invention is to provide in apparatus as above described, winch mechanism for facilitating the raising of the canvas top.

With the above and other objects in view, the invention consists of the improved tent suspension apparatus, and all its parts and combinations, as set forth in the claims, and all equivalents thereof.

In the accompanying drawing, illustrating complete embodiments of preferred forms of the invention, in which the same reference numerals designate the same parts in all of the views:

Fig. 6 is a perspective view showing one end portion of a tent supported by a modified form of apparatus;

Fig. 7 is a vertical sectional view through one of the posts of Fig. 6;

Fig. 8 is a front elevational view of the post of Fig. 7, part being broken away;

Fig. 9 is a fragmentary side elevational view of one of the posts showing the winding gears; and Fig. 10 is a sectional view taken on the line 10—10 of Fig. 8.

Figure 1:
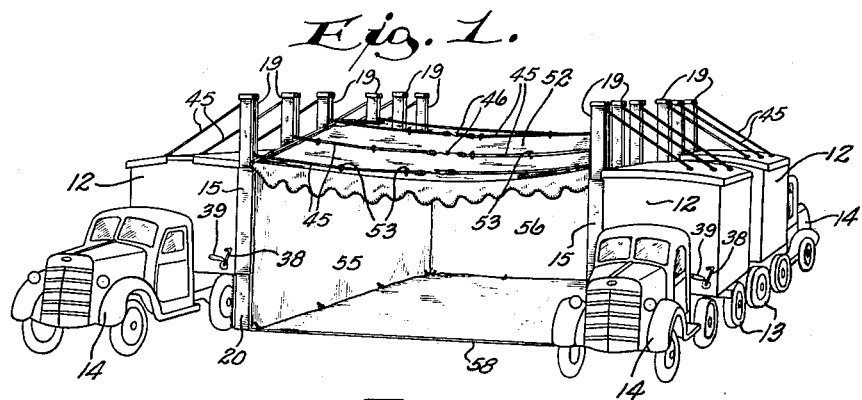
Fig. 1 is a perspective view illustrating a tent in erected condition and supported by the apparatus of one form of the invention, the front of the tent being removed.

Referring more particularly to the drawing, the form of the invention illustrated in Figs. 1 to 5 inclusive, makes use of the bodies of transportation vehicles such as the trailers 12 illustrated in Fig. 1. These may be the same truck or trailer bodies which are used to transport carnival, concession, or other equipment from one town to another. In the adaptation of the invention illustrated in Fig. 1, four of the trailer bodies 12 are utilized, and each trailer body is equipped with wheels 13 and is supported on the rear end of an automotive truck chassis 14.

Secured to one of the sides of each of the bodies 12 are one or more supporting posts 15. It is preferred to utilize three of these posts on each trailer body in equally spaced relationship.

Each supporting post includes spaced side portions 16 having inner vertical edges secured to the truck or trailer body 12. The outer vertical edges of the side portions 16 are flanged toward one another as at 17 but terminate short of meeting to provide a vertical front slot 18.

Telescopically slideable within the main section of each post is an upper telescoping section 19 and a lower telescoping section 20. The top section 19 may be channel shaped in cross section to include a rear wall having rack teeth 21, and to include spaced side walls 22, each having front flanges 23 which terminate short of meeting to provide a front slot 24. The latter is in alignment with the slot 18 of the main section.

The bottom section 20 is preferably channel-shaped in cross section to include a rear wall having rack teeth 25, and to include spaced side walls 26 having front flanges 27. The front flanges terminate short of meeting to provide a front slot 28.

Within the trailer body 12, near the bottom thereof, is a horizontal shaft 29 which may extend the full length of the truck. Mounted on the shaft are rack actuating gears 30, one for each of the supporting posts 15. The rack actuating gears project through slots 31 in the wall of the body 12 and engage the rack teeth 25 of the bottom extensions 20 so as to cause telescoping movement when the gears 30 are rotated.

Extending longitudinally of the body near the upper portion thereof is another shaft 32 which is suitably supported for rotation. Suitable means such as an endless chain 33 which connects sprocket wheels rigidly mounted on the shafts 29 and 32 is adapted to transmit rotation from the shaft 29 to the shaft 32.

Mounted rigidly on the shaft 32 is a gear 34 which engages a gear 35 mounted rigidly on another longitudinally extending shaft 36. The shaft 36 carries a gear 35 for each one of the supporting posts. These gears project through slots 37 in the wall of the body and engage the adjacent rack teeth 21. One end of the lower shaft 29 may be made to extend through the front end of the trailer body and be equipped with a crank 38. Rotation of the crank in one direction will cause the extensions 20 and 19 to be projected simultaneously outwardly to the position of Fig. 2. Rotation of the crank in the opposite direction will cause the extensions to be retracted to a suitable position so as not to interfere with movement of the trailer. A dog 39 engaging the ratchet wheel on the shaft 29 (see Fig. 1), may be employed to releasably hold the mechanism in a desired condition of adjustment. If desired, the shaft 29 may be driven by a suitable connection with the power take-off of the truck.

Movable vertically in each of the supporting posts is a travelling pulley or elevator 40. Each elevator includes a transverse shaft 41 carrying guide wheels 42 on each end. A pulley 43 is loosely mounted on the central portion of the shaft 41 between spaced side members 44 of the elevator frame. A cable 45 having a hook 46 (see Fig. 1) on its outer end is threaded behind each pulley 43. The cable then extends upwardly within its supporting post and passes over an idler pulley 47 which is rotatably supported in fixed position near the top of the post extension 19. Each cable then extends downwardly at an angle through a hole 48 in the top of the trailer body, around a suitably supported guiding pulley 49, and down to a winding drum or winch 50 rigidly mounted on a shaft 51. The shaft 51 is suitably journalled for rotation and carries one winding drum 50 for each supporting post. Any suitable means may be employed for rotating the shaft 51. For large tents, however, it is desirable to have a connection with the power take-off of the truck to facilitate the lifting of the relatively heavy canvas top 52.

In use of the form of the invention just described, the truck or trailer bodies 12 are driven to proper position such as is shown in Fig. 1, with the sides having the supporting posts facing each other. For tents which are not too large, two trucks may be ample, one at each end. For the type of tent illustrated, however, two trucks or trailer bodies are utilized at each end. When the trucks are in proper position, then the cranks 38 are operated to cause the sections 19 and 20 to be projected to the positions shown in Figs. 1, 2 and 3. The lower ends of the bottom extensions 20 are brought into firm engagement with the ground to thus provide an effective outrigger support for the body. Thus, any strains are transmitted to the ground rather than to the vehicle chassis.

Figure 2:
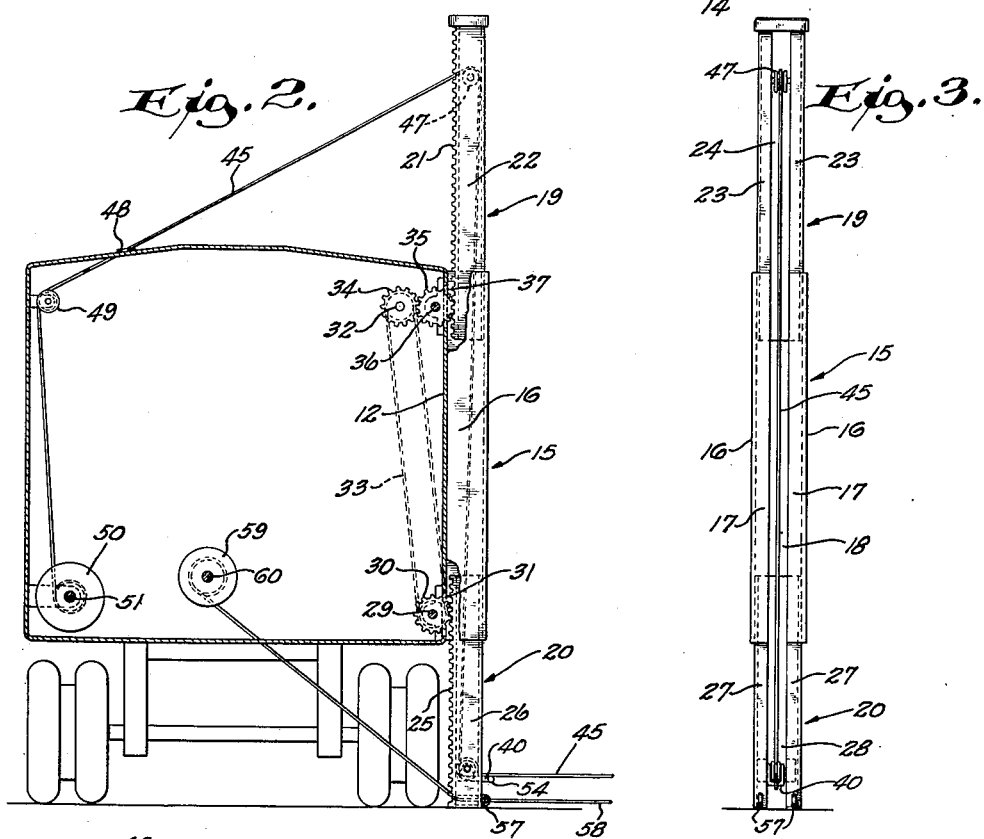
Fig. 2 is a vertical sectional view through one of the trailer bodies showing a connected tent post in extended condition, parts being broken away.
Figure 3:
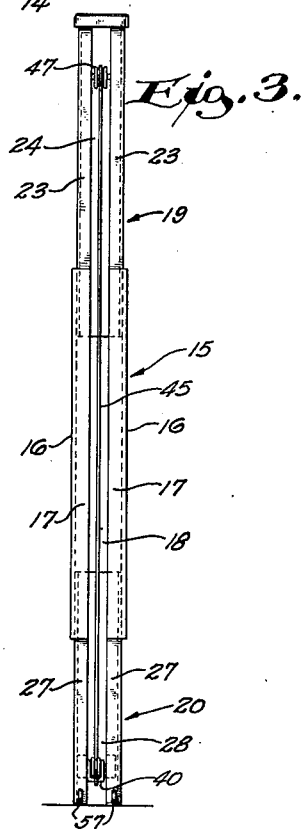
Fig. 3 is a front elevational view of the extended post of Fig. 2.
Figure 4:
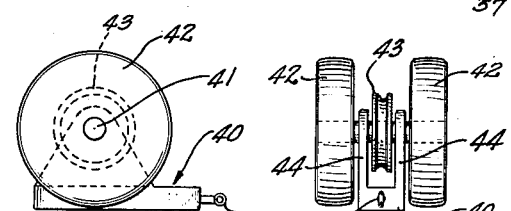
Fig. 4 is a side elevational view of one of the elevators alone.
Figure 5:
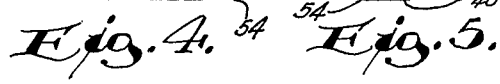
Fig. 5 is a front elevational view of the elevator of Fig. 4.

Next, the shaft 51 is rotated to let out cable 45 and lower the elevators 40 to the approximate position of Fig. 2. For the ridge type of tent illustrated in Fig. 1, certain of the elevators may start out at a slightly higher elevation than others so that they will end up in a correspondingly higher position as in Fig. 1. With the elevators in the lowered position, the canvas top 52 is spread out on the ground between the two sets of supporting posts. The ends of the cables 45 are then threaded through loops 53 on top of the canvas, and the hooks 46 on the ends of the cables from one side are engaged with loops on the ends of the cables from the other side as is clear from Fig. 1. The edges of the canvas 52 may also be equipped with hooks for connection with loops 54 on the elevators. In addition, the end drops 55 may have their upper edges connected to the elevator loops 54 or to the edges of the canvas top 52. A rear drop 56, and if desired, also a front drop, may be suitably connected to the front and rear edges of the canvas top. With the tent parts thus connected, the shafts 51 on the trailer bodies are rotated to cause movement of the elevators 40 from the lowered position of Fig. 2 to raised positions within the upper extensions 19. This causes raising of the canvas top 52 to the position of Fig. 1 and a simultaneous raising of the vertical drops 55 and 56. By stretching the cables 45 tightly, the portions of the cables which are threaded through the loops 53 of the canvas top will assume relatively rigid positions to support the top without the use of any interior posts.

The lower edges of the drops 55 may be connected to loops 57 at the lower ends of the post extensions 20. To tie down the other drops such as the drop 56, cables 58 may be employed. These cables thread through the lower ends of the front and rear supporting posts, extend upwardly through holes in the bottom of the trailer, and connect with winding drums 59 rigidly mounted on shaft 60. The cables 58 on one side may be detachably connected with the ends of cables 58 from the bodies 12 on the other side. This connection may be the same as the hooks 46 used on top. Thus, when the shafts 60 on both sides are rotated, the ground cables 58 may be drawn taut so that the lower edges of drops such as the drop 56 may be anchored thereto. Thus, the necessity of utilizing ground stakes is eliminated.

In the form of the invention illustrated in Figs. 6 to 10, inclusive, the structure is quite similar in principle except that no truck or trailer bodies are utilized. In this form of the invention the supporting posts 61 are generally channel-shaped in cross-section and provided with front flanges 62 which terminate short of meeting to provide a space 63. Suitably connected to each post at the lower end thereof, by welding or any other suitable method, are apertured lugs 64 which project forwardly and rearwardly from the post.

The lower end of each post with the lugs thereon is removably insertable between spaced plates 65 which project upwardly from a base member 66. The plates 65 are provided with apertures which register with apertures in the lugs 64, when the parts are in proper assembled position, so that pins 67 may be inserted to removably hold a post in assembled position on a base.

Each base member is also formed with holes 68 at each corner so that stakes 69 may be driven through the holes and into the ground to anchor the bases in position. To additionally brace each post metal braces 70 may be employed. These braces are adapted to be detachably bolted to the upper ends of the posts as at 71, and to be anchored to the ground by means of pegs 72 driven through openings 73 and into the ground.

The posts may be independent of one another or may be permanently or detachably connected in groups by transverse members 74 as in Fig. 6.

Movable in each post is an elevator 75 having spaced side portions 76 through which an axle 77 extends. Guiding wheels 78 are mounted on the ends of the axle. In addition, pulleys 79 and 80 are loosely mounted on the axle intermediate the elevator side portions 76. The elevator proper may be recessed as at 81, on each side, to cooperate with the edges of the flanges 62 in maintaining the elevator in proper position.

Projecting from the rear side of each post approximately intermediate its length are plates 82 to which the shaft 83 for a winding drum 84 is journalled. One end of each shaft 83 is provided with a rigidly mounted gear 840 which meshes with a smaller gear 85 mounted on a stud shaft 86. One end of each stud shaft may be squared as at 87 for cooperation with a crank. A dog 88 may be employed to releasably hold the winding drum against retrograde movement.

Windable on each drum is a cable 89 which extends over a guiding pulley 90 at the upper end of the post, down and around the pulley 80 on the elevator, upwardly again and around a guiding pulley 91, which is rotatably mounted near the top of the post, and then down and under the pulley 79. From this point the cable passes out through a hole in the elevator 75.

In use of the structure shown in Figs. 6 to 10 inclusive, the canvas top 92 may be laid out on the ground just as heretofore described in connection with the top portion 52 of Fig. 1. The end drops 93 may be hooked to the end edges of the top 92 or to hooks 94 on the elevators. The front and rear drops 95 may be suitably connected at their upper edges to the front and rear edges of the top 92. With the cable ends 89' threaded through loops 96 on the canvas top and connected to the ends of cables from another set of posts at the other end, just as is done at 46 in Fig. 1, and with the edges of the top connected to the elevator hooks 94, when the top may be readily raised by applying cranks to the ends 87 of the studs. This will cause winding of the cables 89 on the drums 84 to cause lifting of the elevators from lowered positions to raised positions. By continuing the winding for a few turns the cable portions 89' will be stretched taut to form a relatively rigid support. Ground cables 97 stretched tightly between the supporting posts at the ends, and ground cables 98 at the front and rear, may be utilized for anchoring the lower ends of the drops 93 and 95 to eliminate the necessity of employing ground stakes.

It is apparent that in both forms of the invention tents may be quickly erected with an expenditure of a relatively small amount of effort. It is also apparent that in both forms of the invention the elevators are employed both for raising the top and for pulling the top supporting cables taut.

Various changes and modifications may be made, without departing from the spirit of the invention, and all of such changes are contemplated, as may come within the scope of the claims.

What we claim is:

1. In a tent suspension apparatus, an upright supporting post, at least one extension telescopically associated with said post, and a travelling pulley associated with said supporting post and extension to move longitudinally therealong and having means associated therewith for connection with a tent portion to raise the latter when said travelling pulley is moved upwardly.

2. In a tent suspension apparatus, a vehicle body, an upright supporting post connected to said body, an extension section telescopically associated with the lower end of said post, means for moving said extension downwardly into engagement with the ground to form an outrigger support for the vehicle body, and a travelling pulley associated with said extension and supporting post to move longitudinally therealong and having means associated therewith for connection with a tent portion to raise the latter when said travelling pulley is moved upwardly.

3. In a tent suspension apparatus, a vehicle body, an upright supporting post connected to said body, an extension section telescopically associated with the lower end of said post, rack and pinion means for moving said extension downwardly into engagement with the ground to form an outrigger support for the vehicle body, and a travelling pulley associated with said extension and supporting post to move longitudinally therealong and having means associated therewith for connection with a tent portion to raise the latter when said travelling pulley is moved upwardly.

4. In a tent suspension apparatus, a vehicle body, an upright supporting post connected to said body, an extension section telescopically associated with the lower end of said post, means for moving said extension section downwardly into engagement with the ground to form an outrigger support for the vehicle body, an extension section telescopically associated with the upper end of said post, and a travelling pulley associated with said supporting post and extensions to move longitudinally therealong and having means associated therewith for connection with a tent portion to raise the latter when said travelling pulley is moved upwardly.

5. In a tent suspension apparatus, a vehicle body, an upright supporting post connected to said body, an extension section telescopically associated with the lower end of said post, means for moving said extension downwardly into engagement with the ground to form an outrigger support for the vehicle body, a travelling pulley associated with said extension and supporting post to move longitudinally therealong and having means associated therewith for connection with a tent portion to raise the latter when the travelling pulley is moved upwardly, a ground cable threaded through the lower portion of said extension section, and means on the vehicle body for tightening said ground cable.

6. A tent comprising supporting posts at one end, oppositely disposed supporting posts at the other end, elevators movably associated with said supporting posts, cable guiding means at the upper portions of said posts, a cable winding drum for at least one of each pair of oppositely disposed posts, a cable for each oppositely disposed pair of posts connected at the ends thereof to at least one of said winding drums and extending over the guiding means of both of said posts and through the elevators of said posts, there being a portion of said cable extending substantially horizontally between the elevators of said posts, and a tent top supported by the horizontal extents of said cables.

7. A tent comprising supporting posts at one end, oppositely disposed supporting posts at the other end, elevators movably associated with said supporting posts, pulleys on said elevators, pulleys rotatably mounted at the upper portions of said posts, cable winding drums on said posts, a cable connected at the ends thereof to the winding drums of each pair of oppositely disposed posts and extending over the guiding pulleys and around a portion of the elevator pulleys of said posts, there being a portion of said cable extending substantially horizontally between said elevator pulleys, a tent top supported by the horizontal extents of said cables, and means for releasably locking the drums against retrograde movement to releasably maintain the elevators in raised position and to maintain the cables taut.

8. A tent comprising a vehicle body at one end, a vehicle body at the opposite end, supporting posts carried by the facing sides of said vehicle bodies, elevators movably associated with said supporting posts, pulleys on said elevators, pulleys rotatably mounted at the upper portions of said posts, cable winding drums on said vehicle bodies, a cable for each pair of oppositely disposed posts connected at one end to a winding drum on one of said vehicle bodies and connected at the other end to a winding drum on the other vehicle body, said cable extending over the guiding pulleys of said pair of oppositely disposed posts and around portions of the elevator pulleys of said posts, there being a portion of said cable extending substantially horizontally between said elevator pulleys, a tent top supported by the horizontal extents of said cables, and means for releasably locking the drums against retrograde movement to releasably maintain the elevators in raised position and to maintain the cables taut.

9. In a tent suspension apparatus a pair of identical, spaced, oppositely disposed devices each comprising a substantially vertical supporting post, an elevator associated with said supporting post to move longitudinally thereof, cable guiding means at the upper portion of said post, cable take-up means spaced from said guiding means, and a cable connected at one end to said take-up means and extending over said guiding means and then through said elevator, and having the other end projecting substantially horizontally from said elevator and separably connected to the projecting end of the cable of the oppositely disposed device to provide raising and supporting means for a tent top.

10. A tent comprising supporting posts at one end, oppositely disposed supporting posts at the other end, elevators movably associated with said supporting posts, cable guiding means at the upper portions of said posts, at least one cable winding drum for each pair of oppositely disposed posts, a cable for each pair of oppositely disposed posts, said cable being connected at one end to said winding drum and extending over the guiding means of one of said posts, thence through the elevator of said post and projecting horizontally to and through the elevator of the other of said posts, thence over the guiding means of said other post to a connection with said other post, fabric wall members connected at their upper edges to said elevators, and a fabric top member connected to the horizontal stretches of said cables.

11. A tent comprising supporting posts at one end, oppositely disposed supporting posts at the other end, elevators movably associated with said supporting posts, pulleys on said elevators, guiding pulleys rotatably mounted at the upper portions of said posts, cable winding drums on said posts, a cable for each pair of oppositely disposed posts, said cable being connected at one end to the winding drum of one of said posts and extending over the guiding pulley of said post, thence around a portion of the elevator pulley of said post and projecting horizontally to and around a portion of the elevator pulley of the other of said oppositely disposed pair of posts, thence over the guiding pulley of said other post to connect to the winding drum of said other post, fabric wall members connected at their upper edges to said elevators, and a fabric top member connected to the horizontal stretches of said cables.

WILLIAM P. McCLELLAN.
FRANK A. SCIPLES.

REFERENCES CITED

The following references are of record in the file of this patent:

UNITED STATES PATENTS

| Number | Name | Date |
|---|---|---|
| 916,762 | McFadden | Mar. 30, 1909 |
| 927,630 | Roberts | July 13, 1909 |
| 1,122,527 | Melcher | Dec. 29, 1914 |
| 1,179,460 | Schultz | Apr. 18, 1916 |
| 2,128,712 | Neff | Aug. 30, 1938 |